United States Patent [19]

Lloyd et al.

[11] 4,084,262
[45] Apr. 11, 1978

[54] DIGITAL MONITOR HAVING MEMORY READOUT BY THE MONITORED SYSTEM

[75] Inventors: Raymond A. Lloyd, Laurel; Thomas A. Keller, Randallstown, both of Md.

[73] Assignee: Westinghouse Electric Corporation, Pittsburgh, Pa.

[21] Appl. No.: 691,177

[22] Filed: May 28, 1976

[51] Int. Cl.² ............................................. G06F 11/00
[52] U.S. Cl. ................................ 364/900; 235/302; 235/312
[58] Field of Search ....................... 445/1; 340/172.5; 235/153 A, 153 AK, 153 AC, 153 AM, 153 AP, 302, 312; 364/200 MS, 900 MS

[56] References Cited

U.S. PATENT DOCUMENTS

| | | | |
|---|---|---|---|
| 3,286,239 | 11/1966 | Thompson et al. | 340/172.5 |
| 3,518,413 | 6/1970 | Holtey | 235/153 AK |
| 3,579,199 | 5/1971 | Anderson et al. | 340/172.5 |
| 3,599,146 | 8/1971 | Weisbecker | 235/153 AM X |
| 3,700,870 | 10/1972 | Howell | 235/153 AM |
| 3,745,316 | 7/1973 | Olah | 235/153 A |
| 3,838,264 | 9/1974 | Maker | 235/153 AM |
| 3,919,533 | 11/1975 | Einolf, Jr. et al. | 235/153 AC |
| 3,949,205 | 4/1976 | Hubert et al. | 235/153 AM |
| 3,963,908 | 6/1976 | Das | 235/153 AM |

*Primary Examiner*—Melvin B. Chapnick
*Attorney, Agent, or Firm*—J. B. Hinson

[57] ABSTRACT

A digital monitor for monitoring the operation of a synchronous digital system. Proper operation of the monitored digital system is determined by storing a predetermined sequence of digital numbers in a memory. The bit patterns generated by the system being monitored are utilized as addresses to read the stored digital numbers. After each read cycle the digital number read from the memory is examined to determine if it has the proper value. If the value is not proper, a memory is set indicating that the system being monitored has malfunctioned. Additionally, the number of bit patterns checked during each cycle of the system is determined. If the correct number of patterns are not checked, the memory is also set indicating that a malfunction has occurred. Apparatus for monitoring a selected number of analog signals such as power supply voltages is also provided. Either of these tests may be inhibited by signals from the system being monitored or by signals from an external source.

7 Claims, 3 Drawing Figures

DIGITAL MONITOR HAVING MEMORY READOUT BY THE MONITORED SYSTEM

BACKGROUND OF THE INVENTION

1. Field of the Invention

The invention relates to methods and apparatus for monitoring digital systems and more particularly to digital monitors which detect malfunctions by comparing a selected number of digital bit patterns generated by the system being monitored to a sequence of stored digital numbers to determine that the correct bit patterns are being generated and that these bit patterns are in the correct sequence.

2. Description of the Prior Art

Prior art monitors for synchronous digital systems have typically utilized a memory of some type to store the bit patterns generated by the system being monitored. The monitor was synchronized with the system to be monitored such that the digital bit patterns stored in the memory were sequentially read and compared to the bit patterns generated by the monitored system. These bit patterns are identical if and only if the system being monitored is operating properly. One disadvantage of these systems from a standpoint of circuit complexity was the fact that each memory location required the storage of a number of bits equal to the number of bits in the pattern to be monitored even though the number of patterns to be monitored was relatively small.

SUMMARY OF THE INVENTION

The disadvantages of prior art synchronous digital system monitors are substantially reduced by the monitor which is the subject of this application. The first step in utilizing the disclosed monitor is to establish the bit patterns generated by the system being monitored during normal operation and the order in which these patterns occur. Each bit pattern is identified by a number to establish a sequence or numbers ranging from 1 to $m$. Numbers 1 through $m$ are then stored in a memory utilizing the sequential bit patterns generated by the system being monitored during normal operation as addresses. The process of determining the sequence of numbers 1 through $m$ and storing these numbers in the memory is referred to as the initialization cycle.

As the system being monitored sequentially cycles through its normal operating cycle the bit patterns generated by the system are coupled to the memory as addresses causing the corresponding memory locations to be read. Each digital number read from the memory is checked to determine if it contains any logic "1" bits. Each time a memory location containing at least one logic "1" bit is read a counter is incremented one count. This causes the counter to sequentially cycle through numbers 1 to $m$ as these numbers are sequentially read from the memory.

Each time the counter is incremented, the output of a counter is compared to the value just read from the memory. If they are identical the associated bit pattern is then known to be correct. If they are different, an error signal is generated indicating that the system being monitored has malfunctioned. Additionally, at the end of the synchronous cycle of the system being monitored the contents of the counter are compared to a digital number to determine if the proper number of correct comparisons have been made. This provides a two level check with each of the bit patterns generated by the system being monitored checked to determine if each pattern is correct and that the correct number of bit patterns was generated. This provides a very reliable check on the proper operation of the associated synchronous systems. Either of these comparisons can be inhibited by an external signal. Additionally, circuitry is provided for monitoring a specified number of analog signals.

The monitor also includes circuitry permitting the error signals generated by the monitor to be interrogated by a digital computer. This feature permits the monitor to be utilized to check individual synchronous digital systems with a digital computer interrogating a plurality of monitors to determine the operational status of the associated systems. This permits the operational status of a large number of digital systems to be conveniently determined at a central location.

If the application indicates that some of the bit patterns generated by the system do not require monitoring, these patterns can be deleted from the monitoring sequence by storing a bit pattern consisting of all zeros in the memory location corresponding to this pattern and deleting this pattern from the sequence of numbers 1 through $m$.

DETAILED DESCRIPTION

Figure 1:
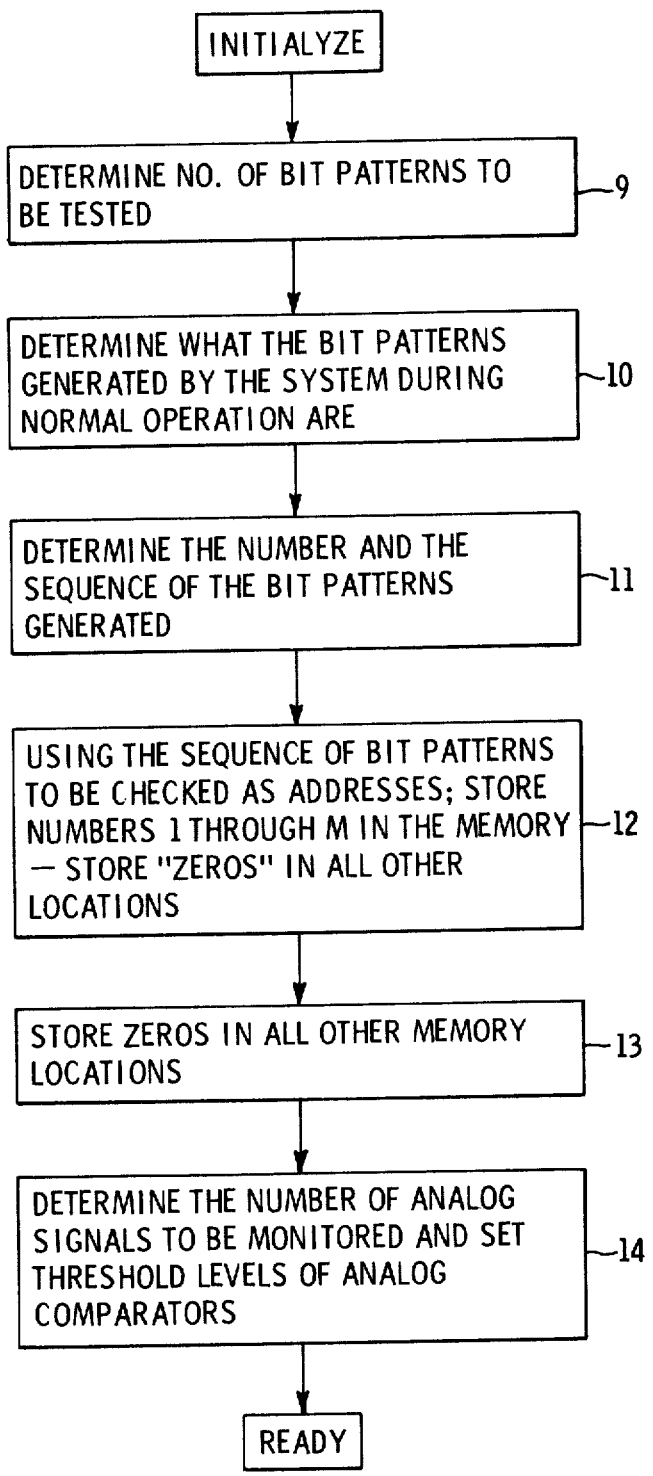
FIG. 1 is a flow chart illustrating the initialization cycle of the monitor.

FIG. 1 is a flow chart illustrating the initialization cycle of the monitor. In initializing the monitor it is necessary to determine the number of bit patterns generated by the system to be monitored, the sequence in which the bit patterns are generated and select the patterns to be monitored. It is not necessary, in general, to monitor each and every bit pattern generated by a synchronous system in order to predict the operational status of the systems because an error associated with one pattern will probably be reflected in a later pattern.

The bit patterns to be monitored are utilized in the sequence in which they are generated as addresses to store digital numbers 1 through $m$ in a memory with $m$ being a number equal to the number of bit patterns to be monitored. Digital numbers consisting of all zero bits are stored in all other memory locations. Bit patterns can be added to or deleted from the list of patterns being monitored by reprogramming the memory. The above described steps for initializing the digital portion of the monitor are defined by the steps illustrated at reference numbers 9-13 of FIG. 1.

The initialization of the analog portions of the monitor consists of determining the number of analog signals to be monitored and setting the threshold levels of the analog comparator. This step is illustrated at reference numeral 14.

Figure 2:
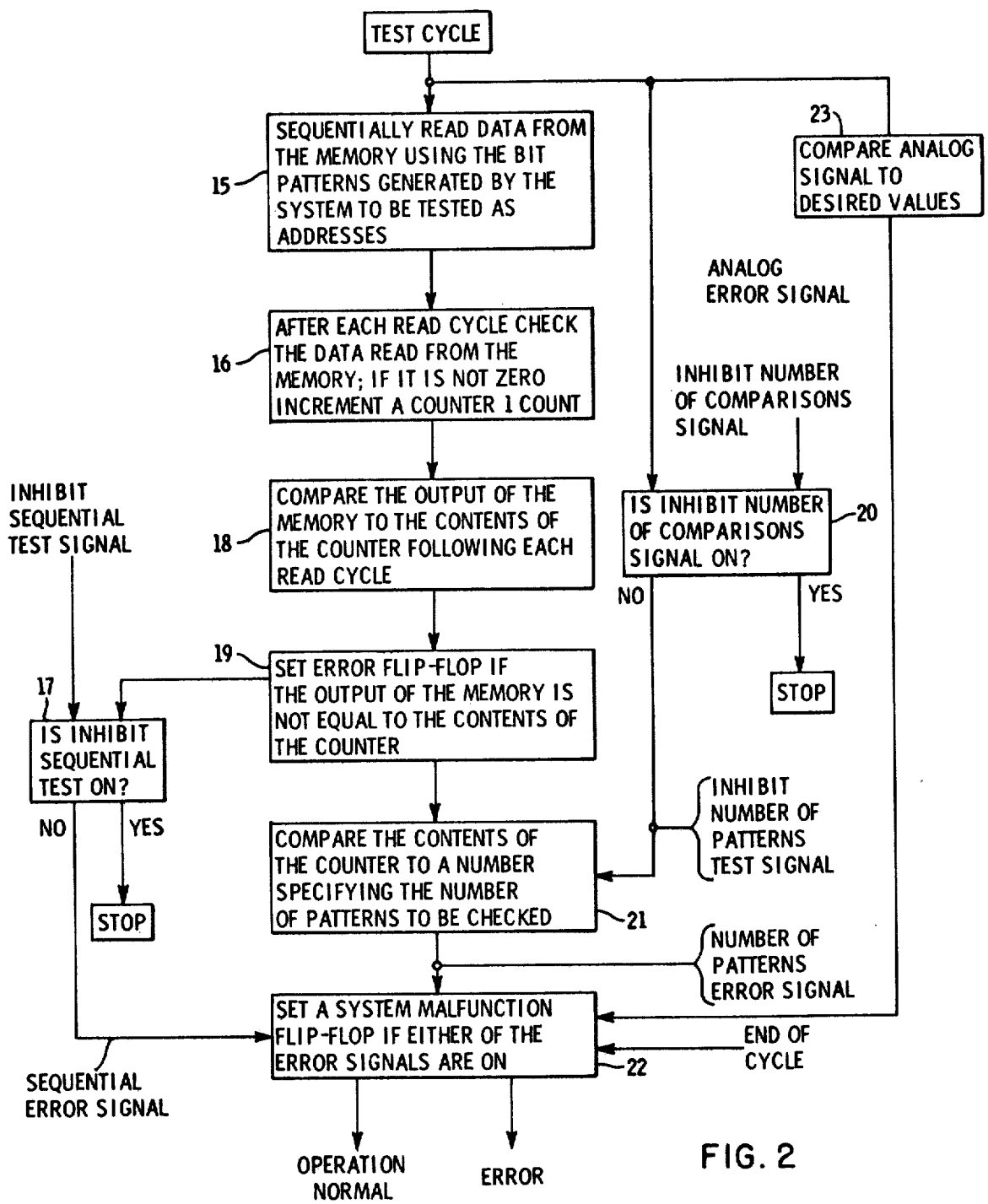
FIG. 2 is a flow chart illustrating the test cycle of the monitor.

After the monitor has been initialized, it is switched to the test cycle illustrated in FIG. 2. The synchronous digital system associated with the monitor is tested by sequentially reading the stored data words from the memory using the bit patterns generated by the synchronous system as addresses. Following each read cycle, the digital word read from the memory is checked to determine if the word contains at least one logic "one" bit. If the word includes at least one logic "one" bit, a counter is incremented one count. These steps are illustrated functionally at reference numerals 15 and 16. The output of the counter is compared to the digital word read from the memory. If the system being monitored is operating properly the counter will sequentially cycle through numbers 1 through $m$ as the numbers 1 through $m$ are sequentially read from the memory. Thus there will always be a one to one correspondence between the output of the counter and the output of the memory. This correspondence indicates that the bit patterns being utilized as addresses are correct. On the other hand, if the contents of the counter and the output of the memory are not identically equal, at least one bit pattern utilized as an address is wrong indicating that the system has malfunctioned. Detection of a malfunction causes an error flip-flop to be set. The output signal of the error flip-flop is combined with an "inhibit sequential test signal" to generate a "sequential error signal". The steps for sequentially performing the above discussed steps are illustrated at reference numerals 15, 16, 17, 18 and 19 of FIG. 1.

The output of this counter is also continuously compared to an external number (digital signal) which specifies the number of words containing at least one logic one bit to be read from the memory during each cycle of the monitored system. The result of this comparison is combined with an "inhibit number of patterns test signal" to generate a "number of patterns error signal" which enables the setting of the system malfunction flip-flop if an error is detected. These steps are illustrated functionally at reference numerals 20, 21 and 22.

Simultaneously with the above described digital test, a selected number of analog signals are compared to desired values for these signals and an "analog error signal" is generated if either of these analog signals is not within prescribed limits. The functional step for performing the analog comparison is illustrated at reference numeral 23.

If either of the above tests indicates a malfunction at the end of the cycle of the monitored system, a system malfunction flip-flop is set. This step is illustrated at reference numeral 22 of FIG. 2.

Figure 3:
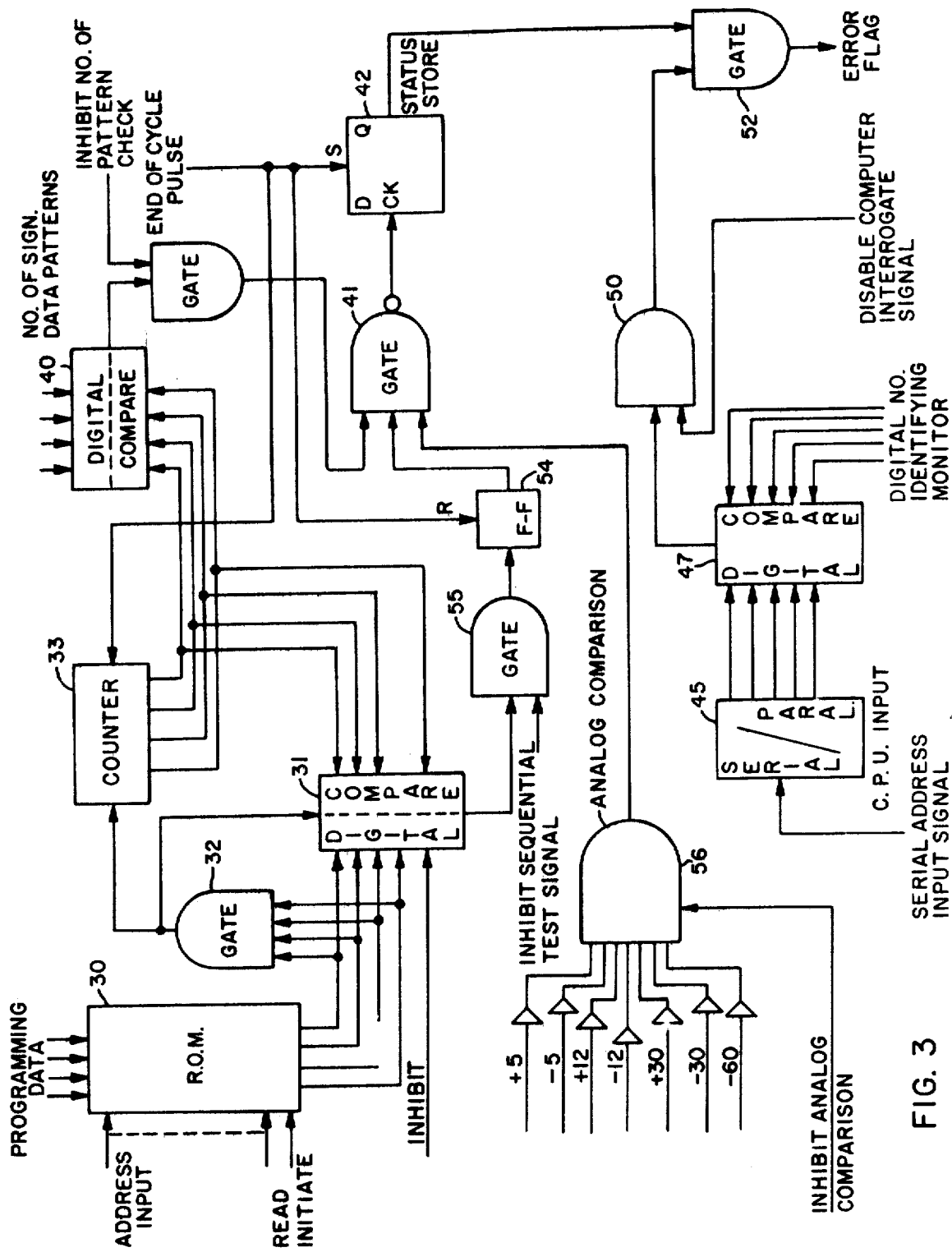
FIG. 3 is a functional block diagram of the monitor.

A functional block diagram of the system for performing the test described above with reference to FIGS. 1 and 2 is illustrated in FIG. 3. The system includes a memory 30 which contains a number of storage locations at least equal to the number of individual bit patterns to be tested. During the initialization cycle, the memory 30 receives addresses and data to be stored in the memory from an external programming system (not shown). The signals coupled to the address inputs are a series of digital bit patterns identical to the bit patterns generated by the system to be monitored when this system is functioning properly. The data stored using these addresses is a sequential series of digital numbers ranging from 1 to $m$ with $m$ being a digital number corresponding to the number of bit patterns to be monitored. Storing of the numbers 1 to $m$ in the memory 30 as described above and storing zeros in the remainder of the memory locations completes the initialization of the digital portion of the monitor. Detailed apparatus for programming the memory is not shown because such apparatus is well known in the prior art.

During the test cycle the sequential bit patterns generated by the system being monitored are coupled to the memory 30 and utilized as addresses to read data from the memory. Immediately following the generation of each of the bit patterns, a read initiate signal is coupled to the memory 30. This causes the data stored in the memory location corresponding to the address specified by the bit pattern coupled to the address input to be read and coupled to a digital comparator circuit 31. The memory 30 has been previously programmed such that the normal or expected bit patterns generated by the systems being monitored and utilized as addresses by the memory 30 will cause numbers 1 through $m$ to be sequentially read from the memory. In addition to being coupled to the input of the digital comparator 31 the data output of the read only memory 30 is coupled to a gate 32. This gate generates a signal at its output anytime the digital signal coupled to its input includes at least one logic "one" bit. Each of these stored words (having values ranging from 1 to $m$) contains at least one bit which is a logic "one". This causes the counter 33 to increment one count each time one of the numbers, 1 through $m$, is read from the memory 30. The output of this gate is also coupled to the digital comparator 31 to inhibit the comparison except during the time when the output of its gate is a logic one. This prevents the generation of incorrect compare signals during the transitions of the input signals to the comparator 31. The other input to the digital comparator 31 is the output of counter 33. Counter 33 is also reset by the end of cycle signal from the system being monitored causing the counter to sequentially cycle through numbers 1 through $m$ so long as the correct data is being read from the memory 30. Since the data read from memory 30 sequentially cycles through values 1 to $m$ only if the address inputs are in the correct sequence, any difference between the data read from the memory 30 and the output of the counter 33 indicates a system malfunction.

The output signal of the comparator 31 is coupled to an error flip-flop 54 through a gate 55. When the output signal of comparator 31 indicates that the output of the memory 30 is not equal to the output of counter 33 this flip-flop is set to indicate that a malfunction has been detected provided that the sequence comparison is not inhibited by the "inhibit sequential test signal" coupled to the second input of gate 55. The output of this flip-flop is coupled through gate 41 to enable the setting of the system malfunction flip-flop 42 on the leading edge of the end of cycle pulse.

A second number specifying the number of patterns to be checked is coupled to the input of a second comparator 40. The second input to this comparator is the number stored in digital counter 33. At the end of the cycle of the system being monitored, the two inputs to this comparator 40 will be identical if and only if the proper number of comparisons have been made. If the proper number of comparisons have not been made the output of this comparator 40 is low indicating that the system being monitored has malfunctioned based on the fact that the proper number of comparisons have not been made.

Analog comparator 56 receives as inputs a number of analog signals such as the power supply voltages of the system being monitored. If any of these voltages are not within predetermined tolerances an "analog error signal" is generated indicating a malfunction. Specifically, the monitor illustrated in FIG. 3 includes an analog comparator 56 for monitoring a plus 5, minus 5, plus 12, minus 12, plus 30, minus 30 and minus 60 volt power supplies. If the output of any of these power supplies is not within prescribed limits the output signal of analog comparator 56 is low indicating that one of the power supplies has malfunctioned. The output of this comparator is combined in a gate 41 with the output signals of comparator 40, and the output signal of error flip-flop 54 to generate a composite malfunction signal. If this signal is high the malfunction flip-flop 42 is set by the end of cycle pulse to a value indicating that an error has been detected. If an error has not been detected the flip-flop will remain in a normal state.

Additional flexibility is provided by circuitry which permits the malfunction flip-flop 42 to be interrogated by an external system such as a digital computer. The circuitry permitting the computer to interrogate the monitor includes a serial to parallel converter 45. This circuit accepts a serial address identifying the individual monitors via a serial data bus from the computer. Serial addressing is contemplated as being the most useful because the interconnection between the computer and the monitor is simpler. It is obvious that parallel addressing could also be utilized with a slight modification of the system.

The serial to parallel converter 45 provides a parallel address identifying the associated monitor to a comparator circuit 47. The other input to this comparator is a digital number identifying the associated monitor. When these two inputs are identical a signal is generated which enables gate 50. The output of gate 50 and the output of the malfunction flip-flop 42 are coupled as inputs to gate 52. If the monitor is not to be interrogated by the computer a logic one is coupled to a second input of gate 50 providing a continuous enable to gates 50 and 52 such that the output of the malfunction flip-flop 42 is always coupled to the output.

The above apparatus can be constructed using well known digital and analog circuits and no detailed circuit description of the system is believed to be required.

We claim:

1. Apparatus for monitoring the operation of a synchronous digital system to detect malfunctions thereof, comprising in combination:
   (a) memory means having stored therein at first predetermined storage locations a first predetermined group of digital numbers comprising a sequence of numbers ranging in value from 1 to $m$ with each storage location being identified by a digital number having a bit pattern corresponding to a bit pattern generated by said synchronous system when said system is operating normally and stored therein at the remaining memory locations a second predetermined group of digital numbers, said first and second predetermined groups of digital numbers being mutually exclusive;
   (b) read means for sequentially reading digital numbers from said memory means utilizing a series of digital bit patterns generated by the system being monitored as addresses;
   (c) a digital counter and means for incrementing said digital counter one count each time a digital number containing at least one logic "one" bit is read from said memory means to generate and store in said digital counter a number corresponding to the number of words containing at least one logic "one" bit which are read from said memory means; and
   (d) first compare means for comparing said digital numbers from said memory means to the number stored in said digital counter to generate a first error signal when the data output of said memory means and said number stored in said digital counter are not identical.

2. Apparatus for monitoring a synchronous digital system in accordance with claim 1 further including:
   (a) a second compare means responsive to an external signal and said number stored in said counter to generate a second error signal if the expected number of digital words containing at least one logic "one" bit are not read from said memory means during each cycle of said synchronous digital system as indicated by said number stored in said counter.

3. Apparatus for monitoring a synchronous digital system in accordance with claim 2 further including means for combining said first and second error signals to produce a composite malfunction signal.

4. Apparatus for monitoring the operation of a synchronous digital system in accordance with claim 3 further including means for selectively inhibiting said second error signal.

5. Apparatus for monitoring a synchronous digital system in accordance with claim 4 further including means for setting a malfunction flip-flop in response to said composite malfunction signal.

6. Apparatus for monitoring a synchronous digital system in accordance with claim 5 further including decoding means responsive to an external digital signal to produce an output signal indicative of the status of said malfunction flip-flop.

7. Apparatus for monitoring a digital system in accordance with claim 5 further including means for monitoring a selected number of analog signals to generate an analog error signal if any of said analog signals are not within prescribed limits and for combining said first and second error signals with said analog error signal to generate a composite error signal.

* * * * *